US011365772B2

(12) United States Patent
Stamml (10) Patent No.: US 11,365,772 B2
(45) Date of Patent: Jun. 21, 2022

(54) HYDRAULIC CONTROL DEVICE AND MARINE TRANSMISSION

(71) Applicant: ZF Friedrichshafen AG, Friedrichshafen (DE)

(72) Inventor: Michael Stamml, Constance (DE)

(73) Assignee: ZF Fridrichshafen AG, Friedrichshafen (DE)

( * ) Notice: Subject to any disclaimer, the term of this patent is extended or adjusted under 35 U.S.C. 154(b) by 0 days.

(21) Appl. No.: 17/258,496

(22) PCT Filed: Jun. 26, 2019

(86) PCT No.: PCT/EP2019/066997
§ 371 (c)(1),
(2) Date: Jan. 7, 2021

(87) PCT Pub. No.: WO2020/025223
PCT Pub. Date: Feb. 6, 2020

(65) Prior Publication Data
US 2021/0156436 A1 May 27, 2021

(30) Foreign Application Priority Data
Jul. 31, 2018 (DE) ...................... 10 2018 212 766.2

(51) Int. Cl.
*F16K 31/122* (2006.01)
*F16D 48/02* (2006.01)
(Continued)

(52) U.S. Cl.
CPC ............. *F16D 48/02* (2013.01); *F16D 25/14* (2013.01); *F16K 31/1225* (2013.01);
(Continued)

(58) Field of Classification Search
CPC .. F16D 48/02; F16D 25/14; F16D 2048/0209; F16D 2048/0221;
(Continued)

(56) References Cited

U.S. PATENT DOCUMENTS 2,080,824 A * 5/1937 Kane ...................... G05D 16/10
137/469
3,566,716 A * 3/1971 Chatterjea ........... F16D 48/0206
192/109 F
(Continued)

FOREIGN PATENT DOCUMENTS

DE 10 2008 043 276 A1 5/2010
DE 10 2015 209 478 A1 11/2016
(Continued)

OTHER PUBLICATIONS

International Search Report Corresponding to PCT/EP2019/066997 dated Sep. 2, 2019.
(Continued)

*Primary Examiner* — Umashankar Venkatesan
(74) *Attorney, Agent, or Firm* — Finch & Maloney PLLC; Michael J. Bujold; Jay S. Franklin (57) ABSTRACT

A hydraulic control device with a pressure control valve that has a control piston and a modulating piston which can move relative to one another. The control piston and the modulating piston are pushed apart from one another by at least one spring. At one end face of the modulating piston there is arranged a pressure chamber in such a manner that when the pressure chamber is filled, the modulating piston is caused to move in the direction toward the control piston. The pressure chamber can be filled by a first volume flow Q1 of a pressure medium. A venting line, with at least one further throttle, is connected to the pressure chamber. A second volume flow Q2 can be discharged, via the venting
(Continued)

line, from the pressure chamber. The hydraulic control device can be utilized in a marine transmission.

6 Claims, 4 Drawing Sheets

(51) Int. Cl.
*G05D 16/10* (2006.01)
*G05D 16/20* (2006.01)

(52) U.S. Cl.
CPC ......... *G05D 16/10* (2013.01); *G05D 16/2026* (2013.01); *F16D 2048/0209* (2013.01); *F16D 2048/0221* (2013.01); *F16D 2500/1105* (2013.01)

(58) Field of Classification Search
CPC ......... F16D 2500/1105; F16K 31/1225; G05D 16/10; G05D 16/2026
See application file for complete search history.

(56) References Cited

U.S. PATENT DOCUMENTS

| | | | | |
|---|---|---|---|---|
| 3,809,201 A | * | 5/1974 | Miyanishi | F16D 48/02 192/109 F |
| 4,086,994 A | * | 5/1978 | Hirosawa | F16D 25/14 137/505.15 |
| 4,281,676 A | | 8/1981 | Morris | |
| 4,289,221 A | * | 9/1981 | Chambers | F16D 48/0206 192/109 F |
| 4,294,278 A | * | 10/1981 | Blake | F16D 25/14 137/115.26 |
| 4,469,011 A | * | 9/1984 | Loffler | F16H 61/065 137/625.6 |
| 4,478,237 A | * | 10/1984 | Blake | F16D 25/14 137/116.3 |
| 5,823,313 A | | 10/1998 | Bohner et al. | |

FOREIGN PATENT DOCUMENTS

| | | |
|---|---|---|
| EP | 0 756 677 B1 | 7/1998 |
| EP | 1 980 767 A2 | 10/2008 |
| JP | S59-103032 A | 6/1984 |

OTHER PUBLICATIONS

Written Opinion Corresponding to PCT/EP2019/066997 dated Sep. 2, 2019.

\* cited by examiner

HYDRAULIC CONTROL DEVICE AND MARINE TRANSMISSION

This application is a National Stage completion of PCT/EP2019/066997 filed Jun. 26, 2019, which claims priority from German patent application serial no. 10 2018 212 766.2 filed Jul. 31, 2018.

FILED OF THE INVENTION

The invention relates to a hydraulic control device, in particular for a marine transmission, and to a marine transmission having a hydraulic control device of that type.

BACKGROUND OF THE INVENTION

In marine transmissions, hydraulic control devices are used in order thereby to regulate the pressure build-up in clutch cylinders of hydraulically actuated shifting clutches. As a rule, hydraulically actuated shifting clutches in marine transmissions are pressure-closed clutches, so that the actuation of the shifting clutch corresponds to the closing of the shifting clutch. Controlled pressure regulation when closing a hydraulically actuated shifting clutch is required, in order to avoid torque surges and resulting high mechanical loads and discomfort. In that context, it is often desired to increase the pressure along a predetermined pressure ramp. In this context one also speaks of pressure modulation. For this, a smooth, but also as rapid as possible engagement of the hydraulically actuated clutch concerned is desired. To achieve that, in marine transmissions a mechanical pressure modulation is often used, which is realized by virtue of compression springs, control pistons and apertures, whereby costly and defect-prone electronic control components can be dispensed with.

However, mechanical pressure modulation is influenced in an undesired manner by temperature-induced variations of the viscosity of the pressure medium. Usually, in hydraulic control devices of marine transmissions mineral oils of the viscosity categories SAE30, SAE40, or multi-range oils are used. At low temperatures the viscosity of the pressure medium is higher and the shifting time of the hydraulically actuated shifting clutch is longer as a result of higher pressure losses in the lines and components of the hydraulic control device. At very low temperatures the shifting time can be substantially longer.

From EP 1 980 767 A2 a hydraulic control device is known for the control of a pressure build-up during the actuation of a hydraulically actuated shifting clutch for a marine transmission. This comprises a pressure control valve with a control piston and a modulating piston, which are arranged together in a concentric bore and are pushed apart from one another by at least one spring. In addition this hydraulic control device comprises a delaying device with throttle points, whose cross-sections self-adjust automatically as a function of the temperature. In that way the flow resistance of the throttles due to temperature is kept constant and the influence of temperature on the duration of the shifting process is minimized. With the hydraulic control device according to EP 1 980 767 A2 this is only possible to a limited extent.

SUMMARY OF THE INVENTION

The purpose of the present invention is to provide an alternative hydraulic control device for a marine transmission, with which the influence of temperature differences on the pressure modulation and hence on the shifting times of actuated shifting clutches is minimized still further or even eliminated completely. In addition the invention includes a marine transmission with a hydraulic control device which has been improved in that manner.

These objectives are achieved by a hydraulic control device for a marine transmission having the features specified in the independent claim(s) and by a marine transmission with those of the independent claim(s). Advantageous further embodiments of the invention are indicated in the respective dependent claims.

According to these, a hydraulic control device with a pressure control valve is proposed. The proposed hydraulic control device is intended in particular to be used for regulating the pressure build-up when actuating a hydraulically actuated shifting clutch. The pressure control valve is preferably accommodated in a control valve housing. The pressure control valve comprises a control piston and a modulating piston which can move relative to one another. For that purpose, the control piston and the modulating piston can be arranged movably in two bores in the control housing. The two bores and the pistons are preferably arranged coaxially with one another and have different diameters. Preferably, the modulating piston and the bore associated with it have a correspondingly larger diameter than the control piston and the bore associated with it. The two mutually coaxial bores can merge into one another, so that one can also speak of a stepped bore in which the control piston and the modulating piston are movably accommodated.

The control piston and the modulating piston are pushed apart from one another by at least one spring. For example, preferably two compression springs can be arranged between the two pistons to push them apart. At one end face of the modulating piston a pressure chamber is arranged, so that filling of the pressure chamber displaces the modulating piston in the direction toward the control piston. The pressure chamber can be filled through a first throttle with a first volume flow $Q1$ of a pressure medium. The first throttle can be arranged in a line that connects a clutch pressure line to the pressure chamber. The clutch pressure line can connect the pressure outlet of a clutch valve to a pressure chamber of a hydraulically actuated shifting clutch. The first throttle can also be regarded as the sum of the flow resistances of lines and if appropriate an aperture and a filter sieve. Specific example embodiments of such hydraulic control devices are, for example, described in EP 1 980 767 A2 and in EP 0 756 677 B1.

According to the present invention, a venting line with at least one further throttle is connected to the pressure chamber. A second volume flow $Q2$ can be discharged from the pressure chamber via the further throttle. When the pressure chamber is pressurized via the first throttle, a third volume flow $Q3$ is produced in the pressure chamber as the difference between the first volume flow $Q1$ and the second volume flow $Q2$. The venting line with the further throttle connected to the pressure chamber has the effect that the further throttle reacts to temperature variations at least similarly to the first throttle, whereby the volume flow $Q2$ through the further throttle changes in the same direction as the volume flow $Q1$ through the first throttle. Thus, the volume flow $Q3$, namely the difference in value between the first volume flow $Q1$ and the second volume flow $Q2$, is therefore less prone to temperature-induced changes than in the case of conventional hydraulic control devices without a venting line. Consequently, an undesired temperature dependence of the volume flow Q3 in the pressure chamber can at least partially be compensated for.

During the pressure modulation, the volume of the pressure chamber increases. Thereby, the modulating piston is moved in the direction toward the control piston against the force of the spring. Thus, in turn the pressure for actuating the associated shifting clutch increases correspondingly. By virtue of the invention, this increase and pressure variation are at least less dependent on the temperature and viscosity of the pressure medium. By virtue of the invention, the volume change over time can be kept at least approximately constant. Consequently the reaction times when closing a hydraulically actuated shifting clutch with the help of the hydraulic control device are also less temperature-dependent. In other words, the hydraulically actuated shifting clutch can be closed at least almost equally quickly regardless of the temperature.

Preferably it is provided that the respective dimensions of the first throttle and the further throttle are matched to one another in such manner that a volume flow Q3, produced in the pressure chamber as a difference value between the first volume flow Q1 and the second volume flow Q2, behaves in a temperature-stable manner. In other words, the dimensions of the two throttles can be matched to one another in such manner that temperature-induced volume flow changes are fully compensated for and thus avoided. In particular the dimensions of the two throttles can be matched to one another by a selective choice of their diameters and bore lengths. Those with knowledge of the field will be able to determine optimum dimensions of the two throttles by calculation. The actual behavior can then be checked in subsequent tests and, if necessary, adjusted. In this context temperature-stable also applies to conditions in which very slight temperature-induced volume flow changes still occur, provided that the slightly changed shifting times of an associated shifting clutch resulting therefrom are not perceptible to a master of the vessel.

Alternatively or in addition to the matching of the dimensions of the first throttle and the further throttle, one or both of the throttles can also be designed as temperature-dependent self-adjusting throttles. In that case, the self-adjusting function can be produced, for example, with the help of bimetallic elements.

A further advantage of the invention is that for the first throttle larger dimensions can be chosen without changing the shifting time. For this, it is only necessary to adapt the diameter or dimensions of the further throttle correspondingly.

According to a further preferred embodiment, it is provided that the venting line opens into a spring chamber of the pressure control valve in which the at least one spring is arranged. This enables a very compact design of the pressure control valve. Moreover, no additional components are needed. The term "spring" should be understood to include any elastic element suitable for pushing the control piston and the modulating piston in the direction toward their respective end positions. The spring can in particular be in the form of a compression spring. Advantageously it is also possible to arrange two springs in the spring chamber, which push the control piston and the modulating piston away from one another and in the direction toward their respective end positions. When compressed during the pressure modulation, pressure ramps with differently steep slopes can be produced with the help of two compression springs.

Particularly preferably, the venting line can be integrated with the further throttle in the modulating piston. In the simplest case, the venting line is in the form of a through-hole which at the same time functions as the further throttle. This means than no separate component is needed as the throttle. In this case the through-hole is the further throttle. The through-hole can pass through the end cover of the modulating piston. Then the through-hole or venting line connects the pressure chamber to the spring chamber.

The invention also includes a marine transmission with a hydraulic control device according to any of the above-described embodiments.

BRIEF DESCRIPTION OF THE DRAWINGS

Further features and advantages of the invention emerge from the attached figures and the figure description given below.

The figures show.

DETAILED DESCRIPTION OF THE PREFERRED EMBODIMENTS

Figure 1:
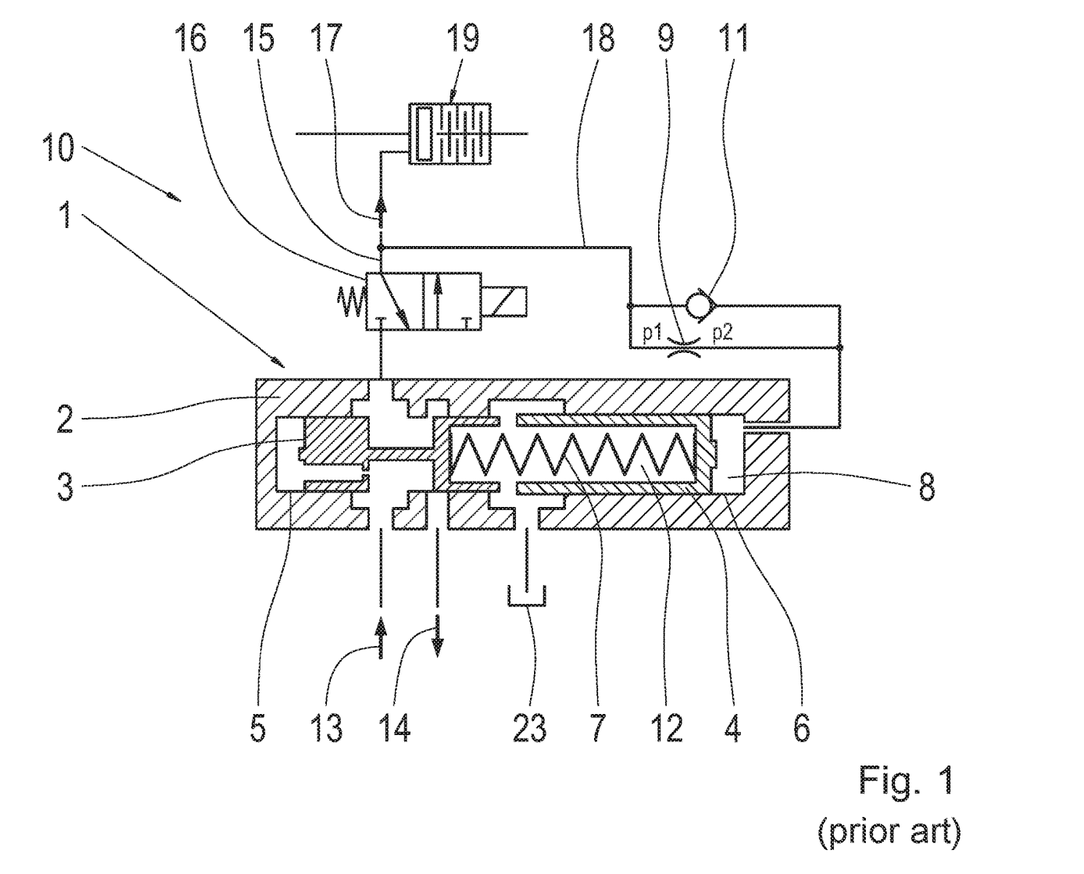
FIG. 1: A section of a hydraulic control device for a marine transmission according to the prior art, represented schematically.

The principle of the structure of part of a hydraulic control device with a pressure control valve 1 according to the prior art is shown in FIG. 1. The pressure control valve 1 comprises a control piston 3 and a modulating piston 4, which are arranged coaxially with one another in a control housing 2 and which can move relative to one another. The control piston 3 and the modulating piston 4 are arranged and can move in respective bores 5, 6 of the control housing 2. The bore 5 of the control piston 3 is arranged coaxially with the bore 6 of the modulating piston 4 so that the control piston 3 is also arranged coaxially with the modulating piston 4. The bore 5 of the control piston 3 has a smaller diameter than the bore 6 of the modulating piston 4. Correspondingly the diameters of the two pistons 3, 4 are also different. Between the control piston 3 and the modulating piston 4 there is arranged a spring 7, which pushes the two pistons 3, 4 apart from one another. In this case, the spring 7 is in the form of a spiral compression spring. At one end face of the modulating piston 4 a pressure chamber 8 is arranged in such manner that when filled, it pushes the modulating piston 4 in the direction toward the control piston 3.

The pressure control valve 1 has an oil supply connection 13 which is connected to a pump (not shown). The pump supplies the pressure medium to the oil supply connection 13 at a sufficient system pressure. In addition the pressure control valve 1 has a lubrication connection 14, by way of which various lubrication points can be supplied with pressure medium. The pressure medium can serve at the same time for the lubrication and the cooling of components.

Finally, the hydraulic control device comprises a clutch valve 16, which is arranged in a clutch pressure line 15. By actuating the clutch valve 16, a pressure outlet of the pressure control valve 1 can be connected via a clutch pressure connection 17 to a pressure chamber of a hydraulically actuated shifting clutch 19. When the clutch valve 16 is not actuated, the associated shifting clutch 19 is or will be vented. The modulating piston 4 is then on the right in FIG. 1 against the stop. The spring 7 pushes against the control piston 3 and correspondingly a lower pressure is produced in accordance with the spring force of the spring 7, which is present at the clutch valve 16. If now the clutch valve 16 is actuated, then the pressure medium flows into the pressure chamber of the shifting clutch 19 but also, via a connection line 18 and a first throttle 9 into the pressure chamber 8 behind the modulating piston 4. In that way the pressure chamber 8 can be filled with pressure medium via the first throttle 9. A non-return valve 11, which is arranged in the connection line 18 parallel to the first throttle 9, is closed during the filling of the pressure chamber 8. The volume flow passing through the first throttle 9 into the pressure chamber 8 during the filling of the pressure chamber 8 is called the volume flow Q1.

In FIG. 1 a first pressure $p_1$ is plotted, which is present between the clutch pressure line 15 and the first throttle 9. In addition, in FIG. 1 a second pressure $p_2$ is plotted, which is present in the connection line 18 between the first throttle 9 and the pressure chamber 8. In this case the following relationships apply, at least approximately:

$$p_1 = F\_\text{pressure spring}/A\_\text{control piston};$$

and for $p_2$, at least approximately, $$p_2 = F\_\text{pressure spring}/A\_\text{modulating piston},$$

where

F_pressure spring is the spring force of the spring 7,
A_control piston is the area of the control piston and
A_modulating piston is the area of the modulating piston.

Since A_control piston is smaller than A_modulating piston, at the first throttle 9 there is correspondingly a positive pressure difference or pressure drop, which brings about the volume flow Q1. Here, the first throttle 9 is the sum of the flow resistances of lines, an aperture if there is one and a filter sieve.

The pressure chamber 8 is now filled when the clutch valve 16 is actuated, and the modulating piston 4 correspondingly moves slowly to the left and further prestresses the spring 7. A pressure ramp is produced. In this variant, the pressure ramp rises until the modulating piston 4 finally contacts the control piston 3, which is then necessarily pushed to the left and closes the control edge for lubrication 14. The pressure then increases abruptly to a system pressure level which is regulated by a system pressure valve (not shown). The control piston 3 has a control geometry with control edges which, when the control piston is moved, controls the pressure at the clutch pressure connection 17 and thus also the pressure $p_1$. The function of the pressure control valve 1 now ensures that the pressure $p_1$ increases, whereby the pressure in the pressure chamber of the associated shifting clutch 19 increases correspondingly. This function of the pressure control valve 1 is familiar to a person with knowledge of the field, for example from EP 1 980 767 A2 which was mentioned earlier, to which reference is made at this point.

The flow resistance of the first throttle 9 acting on the volume flow Q1 is a function of the viscosity of the pressure medium. Thus, the volume flow Q1 varies as a function of the temperature of the pressure medium. Accordingly, the speed of the modulating piston also changes with temperature. Thus, in this varient the shifting time of the hydraulically actuated shifting clutch 19 is subject to considerable temperature-dependent fluctuations.

Figure 2:
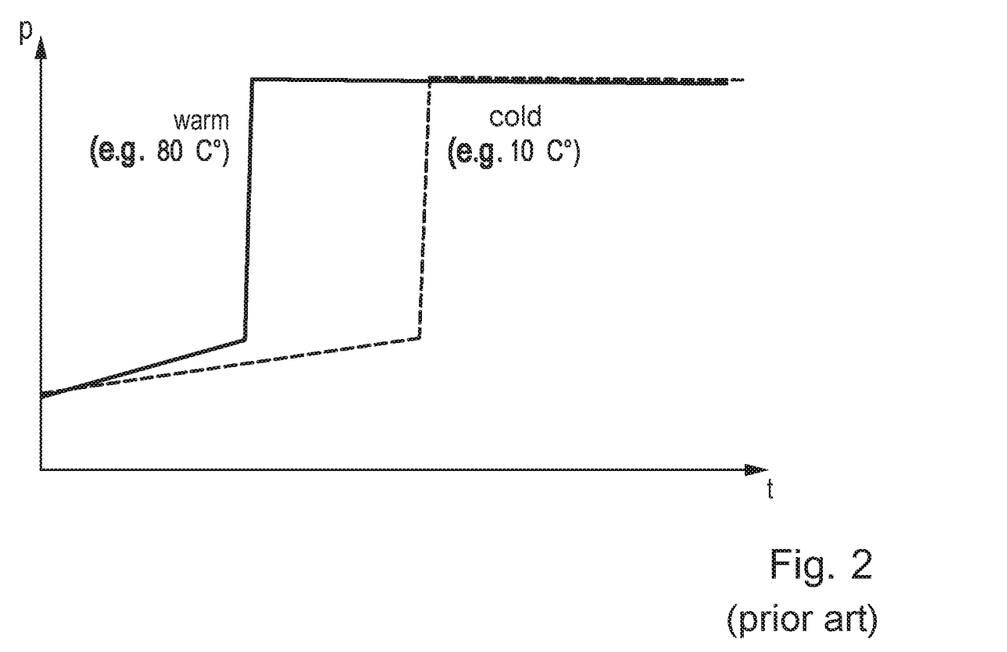
FIG. 2: A diagram showing the pressure variation of a clutch pressure in a marine transmission having a hydraulic control device according to FIG. 1.

The temperature-dependent fluctuations can be seen in FIG. 2. FIG. 2 shows a diagram with the pressure variation of a clutch pressure when the shifting clutch 19 is actuated, in the case of a conventional hydraulic control device 10 in cold and hot conditions.

The time t is shown along the horizontal axis of the diagram. The vertical axis represents the clutch pressure p. The solid functional line represents the variation of the clutch pressure when the shifting clutch 19 is engaged in hot conditions, for example at 80 degrees Celsius. The dotted line represents the variation of the clutch pressure when the shifting clutch 19 is engaged in cold conditions, for example at 10 degrees Celsius. It can be seen clearly that under cold conditions the clutch pressure increases after a substantial time delay. The result of this is that the shifting clutch is closed with a corresponding time delay. Such temperature-induced variations of the shifting times of the shifting clutch are undesirable.

Figure 3:
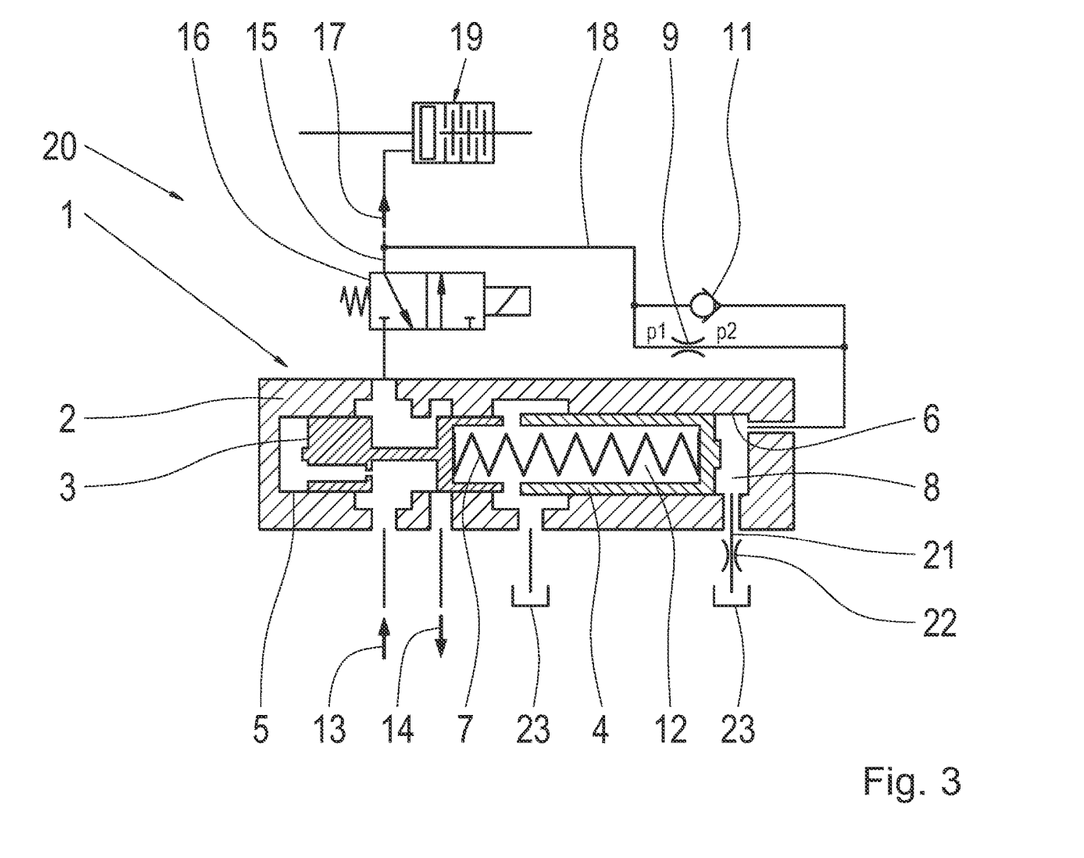
FIG. 3: A section of a hydraulic control device according to the invention for a marine transmission, represented schematically.

The remedy for the problematic temperature-dependent shifting times is shown in FIG. 3 in the form of the hydraulic control device 20 according to the invention for a marine transmission. The hydraulic control device according to FIG. 3 corresponds to a very large extent with the control device according to FIG. 1. Accordingly, the same components in FIGS. 1 and 3 are given the same indexes and equivalent functions will not be explained again here.

In the hydraulic control device 20 according to the invention a venting line 21 with a further throttle 22 is connected to the pressure chamber 8. Via the venting line 21 with the further throttle 22, a second volume flow Q2 can be discharged from the pressure chamber 8, so that in the pressure chamber 8 a volume flow Q3 is obtained as the difference between the first volume flow Q1 and the second volume flow Q2. The dimensions of the first throttle 9 and the further throttle 22 are matched to one another in such manner that the volume flow Q3 remains at least approximately constant with temperature. In that way the modulated pressure build-up after the clutch valve 16 has been actuated always takes place in the same way regardless of the temperature. Consequently, the shifting times of the shifting clutch 19 are also independent of the temperature of the pressure medium.

In other words, an additional consumer in the form of the venting line 21 with the further throttle 22 is added to the pressure chamber 8. The pressure medium can be vented through the venting line 21, for example into a return container 23. From the return container 23 a pump can draw off the pressure medium again and circulate it. The further throttle 22 or the volume flow through the further throttle 22 is viscosity-dependent or temperature-dependent as well. However, the diameters and bore lengths of the two throttles 9 and 22 are now matched to one another in such manner that the volume flow Q3 in the pressure chamber 8 behaves in a temperature-stable manner. The following relationship applies:

$$Q3 = Q1 - Q2, \text{ whereby}$$

Q3 is the resulting volume flow in the pressure chamber 8,
Q1 is the volume flow through the first throttle 9, and
Q2 is the volume flow through the further throttle 22.

If the volume flow Q1 decreases due to increasing viscosity, then Q2 as well decreases and the result of the subtraction Q1−Q2 ideally remains constant. Thus, the influence of viscosity or temperature is substantially reduced or even eliminated. The pressure modulation and the shifting times are still only very slightly dependent on the pressure medium and its temperature.

A constant small amount of oil flows through the valve or through the piston chamber 8 behind the modulating valve. This has the advantage that over prolonged periods of inactivity air can escape, which due to its compressibility could otherwise have adverse effects on the pressure modulation and the shifting behavior. Furthermore residual oil is flushed out, which for example has still remained in the piston chamber after a transmission test run. Undesired temperature differences are also equalized by the continuously flowing amount of oil. A further advantage is obtained in that for the first throttle 9 larger diameters can be chosen without prolonging the shifting time. This reduces the risk that the throttles 9, 22 might become blocked. The ratio of diameter to bore length is improved by increasing the diameter and the first throttle 9 becomes very close to an ideal aperture, which in turn also has a positive effect on the temperature behavior. An ideal aperture is an abruptly occurring constriction in a rotationally symmetrical duct in the form of a bore with as short a bore length as possible, wherein the ratio of aperture diameter to duct diameter is smaller than 0.2.

A further advantage is the simple implementation of the invention. For example no additional components are needed if the further throttle 22 is integrated in the modulating piston 4 and vented into the spring chamber 12. For this, for example, a simple through-bore through the end face of the modulating piston 4 may be sufficient as the further throttle 22. In that case the through-bore connects the pressure chamber 8 to the spring chamber 12 and thus constitutes the venting line 21 with the further throttle 22. Preferably, the diameter of such a through-bore is matched to the dimensions of the first throttle 9 in such manner that the control device behaves in a temperature-stable manner, as explained above.

Figure 4:
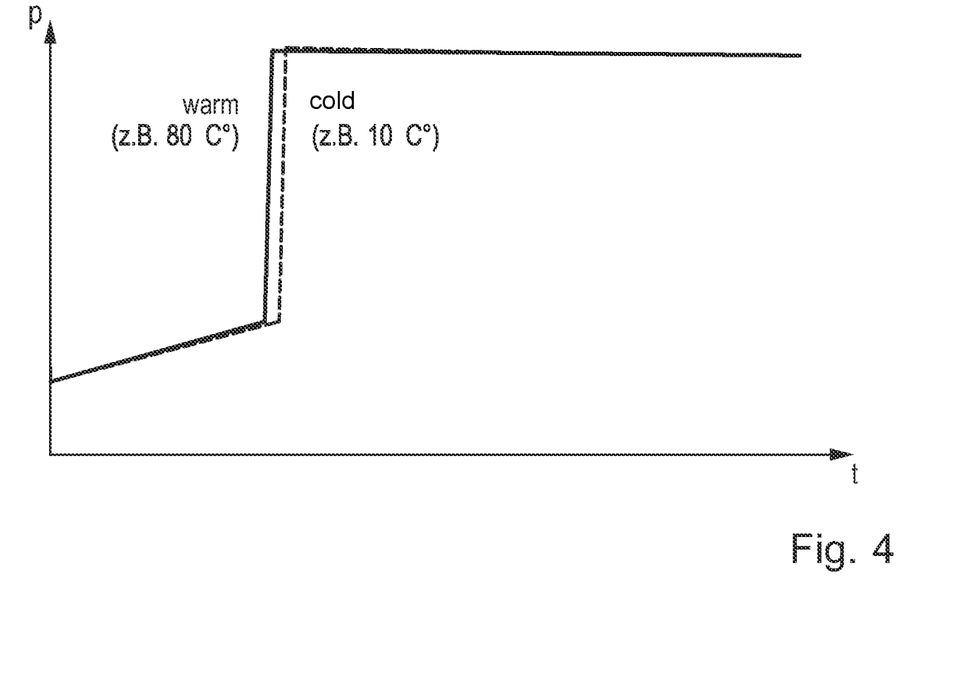
FIG. 4: A diagram showing the pressure variation of a clutch pressure in a marine transmission having a hydraulic control device according to FIG. 3.

Finally, FIG. 4 shows a diagram with the pressure variation of a clutch pressure when the shifting clutch 19 is actuated, with the control device 20 according to the invention in cold and hot conditions.

Again, time t is plotted along the horizontal axis of the diagram while the vertical axis represents the clutch pressure p. The solid line shows the variation of the clutch pressure when the shifting clutch 19 is engaged in hot conditions, for example at 80 degrees Celsius. The dotted line shows the variation of the clutch pressure when the shifting clutch 19 is engaged in cold conditions, for example at 10 degrees Celsius. It can be seen that in cold conditions the clutch pressure increases with almost no time delay compared with the pressure increase under hot conditions. As a result, even in cold conditions the shifting clutch 19 is closed almost without any time delay. Slight delays, as shown by the slight deviation between the two function lines shown in FIG. 4, can also still occur in practice. However, by virtue of the invention such delays can be reduced at least to the extent that the delayed shifting times of the shifting clutch 19 are no longer perceptible to the master of the vessel.

It may even be that in certain applications or shifting clutches a slightly extended shifting time may be desired, since particularly in the case of large clutches the filling time when the oil is cold also lasts longer as a rule. By virtue of the present invention, however, a slightly longer temperature-dependent shifting time for that purpose can be selectively adjusted and does not occur randomly.

INDEXES

1 Pressure control valve
2 Control housing
3 Control piston
4 Modulating piston
5 Bore
6 Bore
7 Spring
8 Pressure chamber
9 First throttle
10 Hydraulic control device
11 Non-return valve
12 Spring chamber
13 Oil supply connection
14 Lubrication connection
15 Clutch pressure line
16 Clutch valve
17 Clutch pressure connection
18 Connection line
19 Shifting clutch
20 Hydraulic control device
21 Venting line
22 Further throttle
23 Return container

The invention claimed is:

1. A hydraulic control device with a pressure control valve comprising:
    a control piston and a modulating piston being coaxially movable relative to one another,
    at least one spring being arranged between the control piston and the modulating piston and axially pushing the control piston and the modulating piston in opposite directions away from one another,
    a pressure chamber being arranged adjacent an end face of the modulating piston such that pressurization of the pressure chamber, by a third volume flow of pressure medium, pushing the modulating piston in a direction toward the control piston,
    a first volume flow of the pressure medium flowing, via a first throttle, into the pressure chamber for pressurizing the pressure chamber,
    a venting line being connected to the pressure chamber and having a second throttle through which a second volume flow of the pressure medium can be discharged from the pressure chamber, and
    the third volume flow being equal to a difference between the first volume flow and the second volume flow, and
    wherein respective dimensions of the first throttle and the further throttle are matched to one another in such a manner that the third volume flow is produced in the pressure chamber, and this differential volume flow behaves in a temperature-stable manner or has a desired temperature dependence.

2. A hydraulic control device with a pressure control valve, the pressure control valve comprising:
    a control piston and a modulating piston being are movable relative to one another,
    the control piston and the modulating piston being pushed apart from one another by at least one spring,
    a pressure chamber being arranged, at one end face of the modulating piston, in such a manner that when the pressure chamber is filled, the modulating piston being moved in a direction toward the control piston,
    the pressure chamber being fillable with a first volume flow of a pressure medium through a first throttle,
    a venting line with at least one further throttle, through which a second volume flow can be discharged from the pressure chamber, being connected to the pressure chamber, and wherein respective dimensions of the first throttle and the further throttle are matched to one another in such a manner that a third volume flow, which is a difference between the first volume flow and the second volume flow, is produced in the pressure chamber, and this differential volume flow behaves in a temperature-stable manner or has a desired temperature dependence.

3. The hydraulic control device according to claim 2, wherein at least one of the first throttle and the further throttle is designed as temperature-dependent self-adjustable throttle(s), and the temperature-induced adjustment of each the at least one temperature-dependent self-adjustable throttle is selectively chosen such that the third volume flow, which is the difference between the first volume flow and the second volume flow and which behaves in the temperature-stable manner or with the desired temperature-dependence, is produced in the pressure chamber.

4. The hydraulic control device according to claim 2, wherein the venting line opens into a spring chamber of the pressure control valve in which the at least one spring is arranged.

5. The hydraulic control device according to claim 2, wherein the venting line is integrated together with the further throttle in the modulating piston.

6. A marine transmission with a hydraulic control device according to claim 2.

* * * * *